United States Patent [19]
Kubota et al.

[11] Patent Number: 5,378,425
[45] Date of Patent: Jan. 3, 1995

[54] METHOD FOR VULCANIZING TIRE AND APPARATUS THEREFOR

[75] Inventors: Akinori Kubota, Kobe; Yoshiya Kubota; Shoji Okatmoto, both of Toyota; Masaaki Ijiri, Aichi; Koji Soeda, Kobe, all of Japan

[73] Assignee: Sumitomo Rubber Industries, Ltd., Hyogo, Japan

[21] Appl. No.: 962,054

[22] Filed: Oct. 16, 1992

Related U.S. Application Data

[63] Continuation of Ser. No. 791,059, Nov. 12, 1991, abandoned.

[30] Foreign Application Priority Data

Nov. 30, 1990 [JP] Japan .................. 2-339594

[51] Int. Cl.⁶ ............................................. B29C 35/04
[52] U.S. Cl. ..................... 264/315; 264/326; 425/35; 425/44
[58] Field of Search ............ 264/85, 315, 326, 501; 425/36, 44, 48, 50, 43, 35

[56] References Cited

U.S. PATENT DOCUMENTS 3,329,748 7/1967 Hugger .......................... 264/315
4,222,721 9/1980 Gado .

FOREIGN PATENT DOCUMENTS 57-87349 5/1982 Japan .
57-185134 11/1982 Japan .
62-201206 9/1987 Japan .
2120967 12/1983 United Kingdom ............ 425/48

Primary Examiner—Mathieu D. Vargot

[57] ABSTRACT

A method for vulcanizing a tire wherein firstly heating medium is blown toward a tire internal surface from a supply opening arranged at a position above an equator of the tire in a mold and secondary pressurizing medium is blown toward the tire internal surface from the supply opening, and an apparatus used therefor. By virtue of the method and the apparatus, in vulcanization, abnormal cooling at a lower bead of a tire is prevented and consequently a large temperature difference inside the tire is prevented, so that uniform vulcanization can be carried out to provide products having high quality. Further, prevention of the temperature difference makes it possible to shorten a time period required for vulcanization, to improve productivity, and to reduce energy loss.

20 Claims, 5 Drawing Sheets

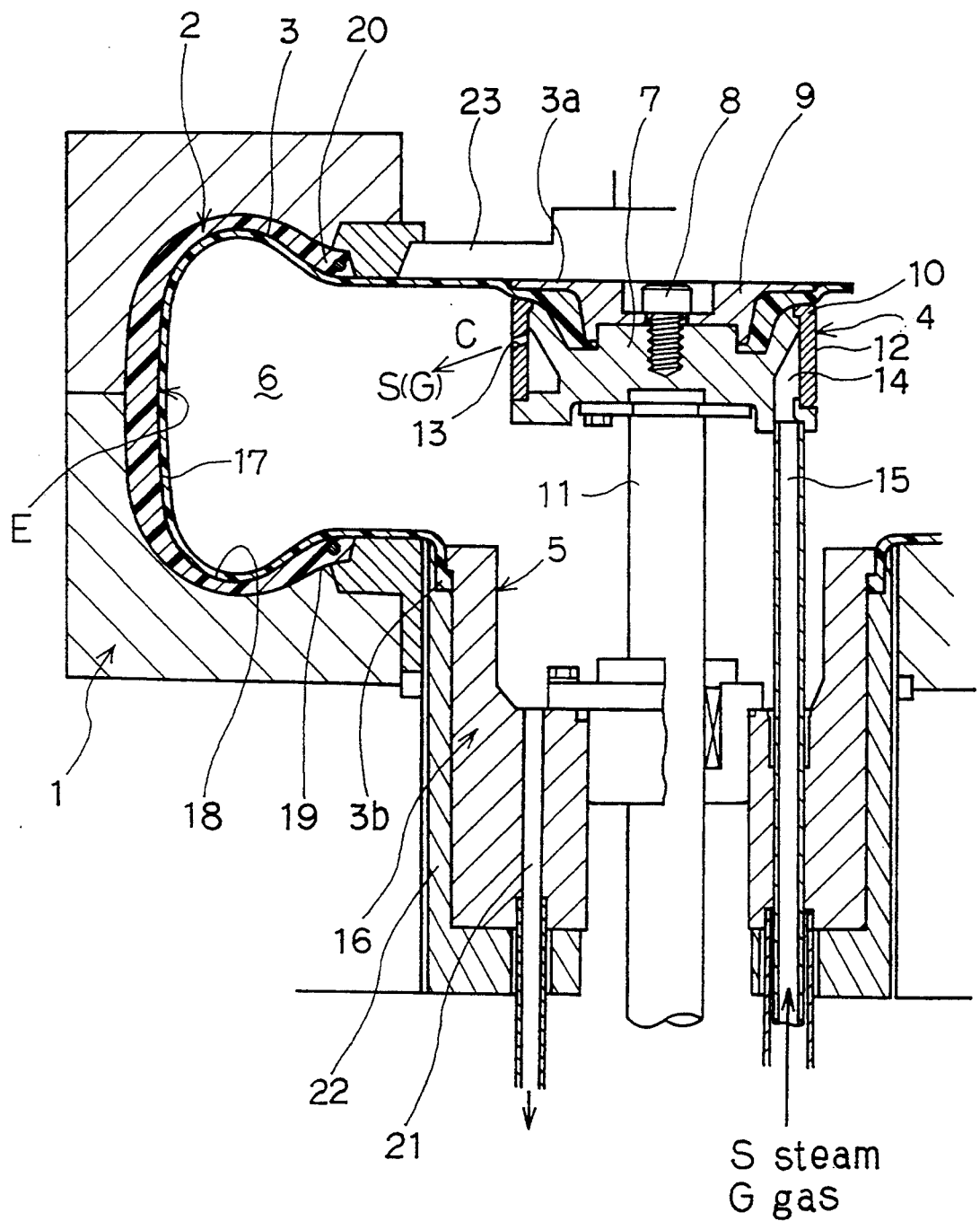

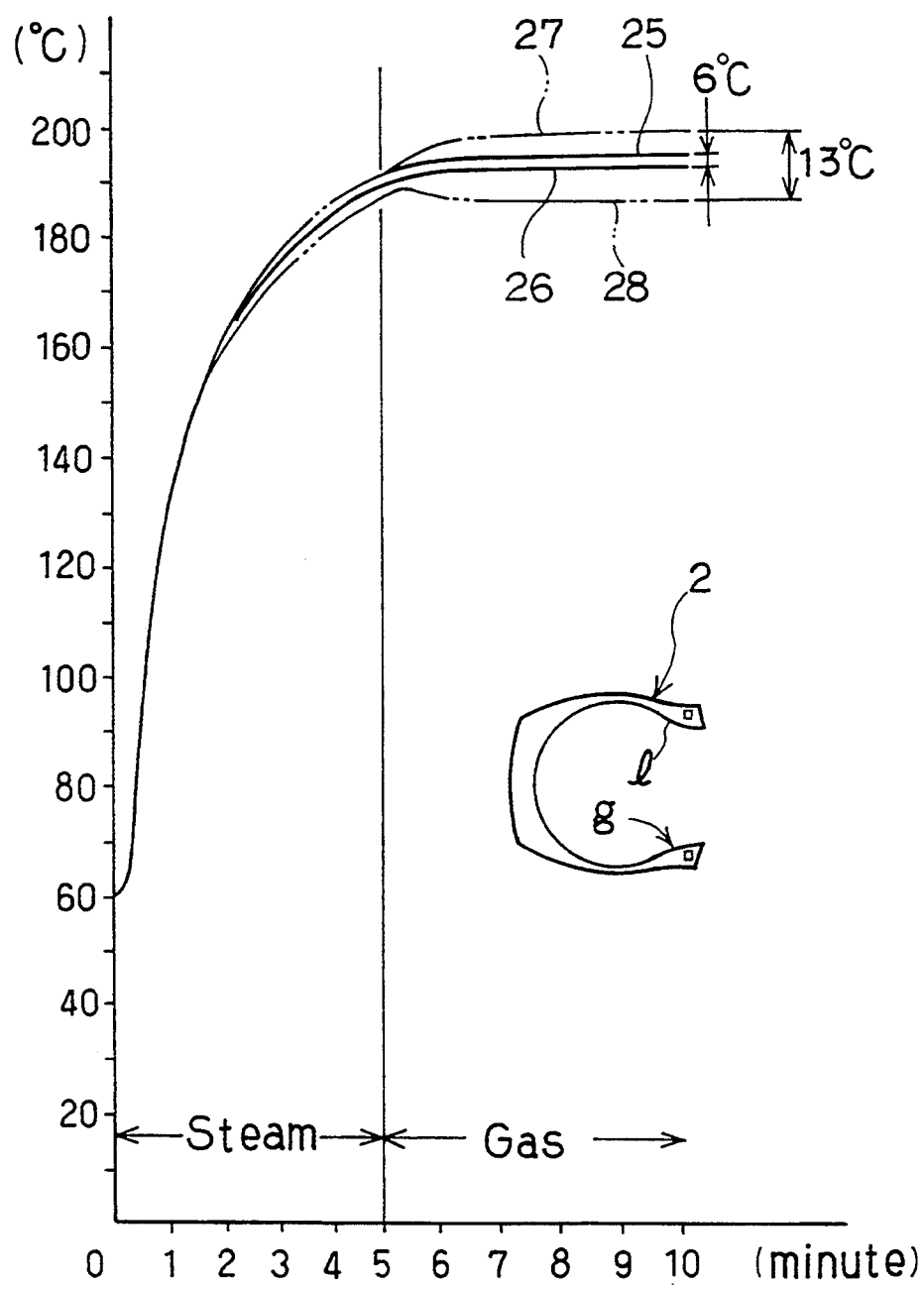

METHOD FOR VULCANIZING TIRE AND APPARATUS THEREFOR

This application is a continuation of application Ser. No. 07/791,059 filed on Nov. 12, 1991, now abandoned.

BACKGROUND OF THE INVENTION

The present invent ion relates to a method for vulcanizing a tire and an apparatus used therefor.

Hitherto, the apparatus shown in FIG. 4 has been employed as an apparatus for vulcanizing a tire of a vehicle. In this case, a tire b is placed inside a mold a, the mold a is chased, and a bladder c is inflated by providing a shaping internal pressure, so that the shape of the tire b becomes to the inside shape of the mold and the tire is placed therealong. Then, steam as a heating medium is blown and supplied, in a nearly horizontal direction, into the tire internal space f to heat and pressurize the tire b. The steam is blown from a supply opening e which is arranged at a lower part of a center portion of the vulcanizing apparatus and communicates with a supply passage d. When the tire b is heated to a predetermined temperature or after a predetermined time period, the supply of steam is stopped and thereafter combustion gas, gaseous nitrogen, or the like as a pressurizing medium, the pressure of which is the same as or more than that of the stream, is supplied, in a nearly horizontal direction, into the tire internal space from the supply opening e. By virtue of the gas, the tire b is kept at a predetermined temperature during remaining time period for heating till tire vulcanization is finished.

In another case of the latest apparatus, it employs a structure wherein heating medium and pressurizing medium are supplied respectively through separated supply openings into the tire internal space.

In the above-mentioned prior art apparatus, pressurizing gas having a relatively low temperature compared with the steam is blown, in a horizontal direction, toward the lower portion of the tire from a supply opening arranged low relative to the tire b, from which the steam is also blown. Accordingly, a part to which the gas flow is directed (i.e. the lower bead g) is cooled and its temperature is lowered. Further, in a condition wherein the pressurizing gas inflow ceases due to an increase of the internal pressure and accordingly internal flow of the, pressurizing gas ceases, the gas tends to gather in the lower portion h of the internal space f of the tire b because the specific gravity of gas is relatively larger than that of steam. Accordingly, the temperature of a lower sidewall i and a lower bead g in contact with the pressurizing; gas of the lower temperature is lowered. On the other hand, steam tends to gather in an upper portion j of the internal space f of the tire b and the temperature of the steam rises by adiabatic compression, although it only lasts a short time, because of the gas introduced at a higher pressure though the temperature thereof is low. This causes temperature of an upper sidewall k and an upper bead l to rise.

Thus, in the tire internal space f, a layer mainly comprising steam in the upper portion j and another layer mainly comprising gas appears in the lower portion h. Accordingly, the temperature of the inside of the tire b changes as shown in FIG. 2. That is, after the gas is supplied, the temperature at the upper bead l tends to rise as represented by a virtual line 27, and the temperature at the lower bead g tends to fall as represented by a virtual line 28. Consequently, there occurs a large temperature difference (for example, 13° C.) between the upper bead l and the lower bead g.

Once the above-mentioned large temperature difference occurs, it does not completely disappear till vulcanization is finished. For this reason, degree of vulcanization at the upper and lower sidewall differs from each other, and this is undesirable in respect of tire quality. In addition, since the necessary cure time is decided according to the, lower port ions of the tire where the speed of temperature rise is most retarded, the vulcanizing operation of longer duration has to be conducted and this is another undesirable problem also in respect of the productivity and energy saving.

The apparat us employing a structure wherein supply openings for heating medium and pressurizing medium are separately arranged has a drawback that the apparatus becomes complicated because the supply of mediums for valucanization is separated.

In consideration of the above-mentioned drawbacks of the conventional apparatus, an object of the present invention is to provide a method for vulcanizing a tire and an apparatus used therefor wherein a temperature difference is hard to occur inside the tire during vulcanization, uniform vulcanization can be carried out, and the structure of the whole apparatus is not complicated.

SUMMARY OF THE INVENTION

In order to achieve the above-mentioned object, in a method for vulcanizing a tire of the present invention, heating medium is blown toward the inner surface of a tire from a supply opening arranged at a position above a tire equator, and thereafter pressurizing medium is blown toward the inner surface of the tire from the same supply opening. In this case, the supply opening can be formed, for exam pie, on an upper bladder clamp of a mold.

Further, in an apparatus of the present invention used for vulcanizing a tire, a supply opening to blow heating medium and pressurizing medium toward the inner surface of a tire is mounted on an upper position above a tire equator. In this case, the supply opening can be formed, for example, on an upper bladder clamp of a mold. Further, the supply opening might be formed on an attachable supply nozzle.

In t he present invention, a lower bead is not cooled because heating medium and pressurizing medium are blown from an upper posit ion above a tire equator in a horizontal direction or a slightly downward direction. Moreover, it is not necessary to form supply openings for heating medium and pressurizing medium separately, so that one supply opening can be used cooperatively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1A is a cross section showing an embodiment of a vulcanizing apparatus of the present invention;

FIG. 2 is a graph showing changes of tire temperature during vulcanization;

DETAILED DESCRIPTION

Figure 1B:
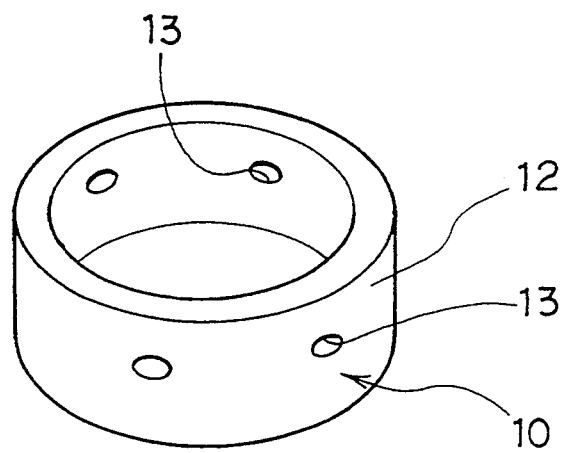
FIG. 1B is a perspective view showing a supply nozzle.

The present invention is now explained in detail with reference to drawings showing the embodiments.

FIG. 1A shows an apparatus of rolling-in-bladder type used for vulcanizing a tire of the present invention. In this apparatus, a green tire 2 is placed in a vulcanization room 6, and a mold 1 is closed. A bladder 3 wherein an upper inner edge portion 3a is held by an upper bladder clamp 4 and a lower inner edge portion 3b is held by a lower bladder clump 5 is inflated by providing a pre-shaping internal pressure, so that the green tire 2 is shaped nearly in the shape defined by an internal surface of the mold 1. Thereafter, heating medium such as steam is supplied into the bladder 3 to heat and pressurize the green tire 2, and the green tire 2 is situated as shown in FIG. 1A. When the green tire 2 is heated to a predetermined temperature or after a predetermined time period, the supply of the heating medium is stopped. Then, gas such as gaseous nitrogen, as a pressurizing medium, having a pressure not lower than that of the heating medium is supplied into the bladder 3, till the remaining time during the heating step is over. Thus, the temperature of the green tire 2 is kept at a predetermined temperature, and the vulcanizing is finished.

The upper bladder clamp 4 comprises a block 7, a ring 9 attached to the block 7 using an attachment member 8 such as a belt, and a supply nozzle 10 attached to the block 7. The upper bladder clamp 4 is arranged on a center post 11. The upper inner edge portion 3a of the bladder 3 is held by the ring 9 and the block 7.

As shown in FIG. 1B, the supply nozzle 10 comprises a short cylindrical body wherein supply openings 13 are formed on a circumferential wall 12 at predetermined intervals along a circumferential direction. The nozzle 10 is attachably engaged with the block 7. When the nozzle 10 is engaged with the block 7, the block 7 and the nozzle 10 define an annular space 14 therebetween, and this space 14 is communicated with the vulcanization space 6 via the supply openings 13. Though the openings 13 are directed diagonally downward in this embodiment, they might be, of course, directed horizontally. Further, the number and diameter of the openings 13 can be selected in accordance with a tire size or the like.

A supply passage 15 for supplying heating medium and pressurizing medium to the space 14 is connected to the block 7. The passage 15 penetrates a bagwell 16 to be connected with a heating medium source and a pressurizing medium source. Thus, heating medium supplied to the passage 15 is blown toward the inner surface 17 of the tire 2, as shown by an arrow C, from the supply opening 13 through the space 14. Similarly, pressurizing medium supplied to the passage 15 is blown toward the inner surface 17 of the tire 2, as shown by the arrow C, from the supply opening 13 through the space 14. In this embodiment, the supply opening 13 is opened toward a vicinity below an equator E of the tire 2 so that heating medium and pressurizing medium are blown, as shown by the arrow C, diagonally downward across the tire internal space. Thus, the jet moves along the tire internal surface 17, passes a lower sidewall 18 of the tire 2, and forces accumulated drain toward a lower bead 19 to discharge it into the bagwell 16. A supply passage of the supply opening 13 is inclined relative to a radial direction of the tire 2 so that heating medium blown from the opening 13 turns in a circumferential direction.

The bagwell 16 is provided with a discharge passage 21 for discharging drain, steam, gas and the like. The bagwell 16 is held by a holder 22. When the bagwell 16 is held by the holder 22, upper edge portions of the bagwell 16 and of the holder 22 chuck the lower inner edge portion 3b of the bladder 3. That is, the upper edge portions of the bagwell 16 and of the holder 22 form a lower bladder clamp 5. As seen in FIG. 1A, the discharge passage 21 and upper opening of the bladder clamp 5 are located below the lower bead 19 of the tire 2.

Next, a method for vulcanizing a tire in an apparatus having the above structure is explained.

Firstly, a green tire 2 is placed on the outer circumference of the bladder 3, and a mold 1 is closed. Then, medium for shaping is supplied into the bladder 3 through a pipe ( not shown) so that the bladder 3 is inflated to shape the tire 2 nearly in a shape defined by an internal surface of the mold 1.

Then, steam of a predetermined pressure is supplied to the supply passage 15 and the steam is blown for five minutes into the vulcanization space 6 toward the tire internal surface 17 from the supply opening 13. In this case, as mentioned above, accumulated drain inside the tire 2 is introduced into the discharge passage 21 by the blown jet and is discharged outside. By virtue of this discharge, the temperature of the lower sidewall 18 rises. Thus, by the supply of stem, the temperature of the green tire 2 rises to a extent that vulcanizing reaction can be progressed.

Thereafter, the supply of the steam is stopped and pressurizing gas having a low temperature about room temperature (for example 40° C.) and a pressure the same as or more than that of the steam is supplied to the supply passage 15 so that the pressurizing gas is blown for five minutes into the vulcanization space 6 toward the tire internal space 17 frown the same supply opening 13 as the case of the steam. Thus, the pressurizing gas blown from the opening 13 cools down and agitates the inside of the tire 2, and finally is mixed with the steam. Consequently, the generation of a large temperature difference between the upper portion and the lower portion in the tire 2 is prevented.

After the vulcanization is finished, the mixture of gas and steam in the vulcanization space 6 is discharged through the discharge line by opening a valve of the pipe (not shown). Thereafter, the bladder 3 is separated from the tire 2 by shutting the valve and opening other valve, lowering an upper clamp ring 23, and lowering the center post 11 and the bagwell 16. Then, the mold is opened, and finally the vulcanized tire 2 is taken out.

In the figures symbol S represents steam as a heating medium and symbol G represents gas as a pressurizing medium.

FIG. 2 shows changes of temperature at a portion l of the upper bead 20 and a portion g of the lower bead 19 of the tire 2. The temperature of the portion l changes as shown by a line 25 after the supply of gas, and the temperature of the portion g changes as shown by a line 26 after the supply of gas. The temperature difference is about 6° C. between the portions l and g, which is much smaller than that of the prior art (13° C.).

Figure 3:
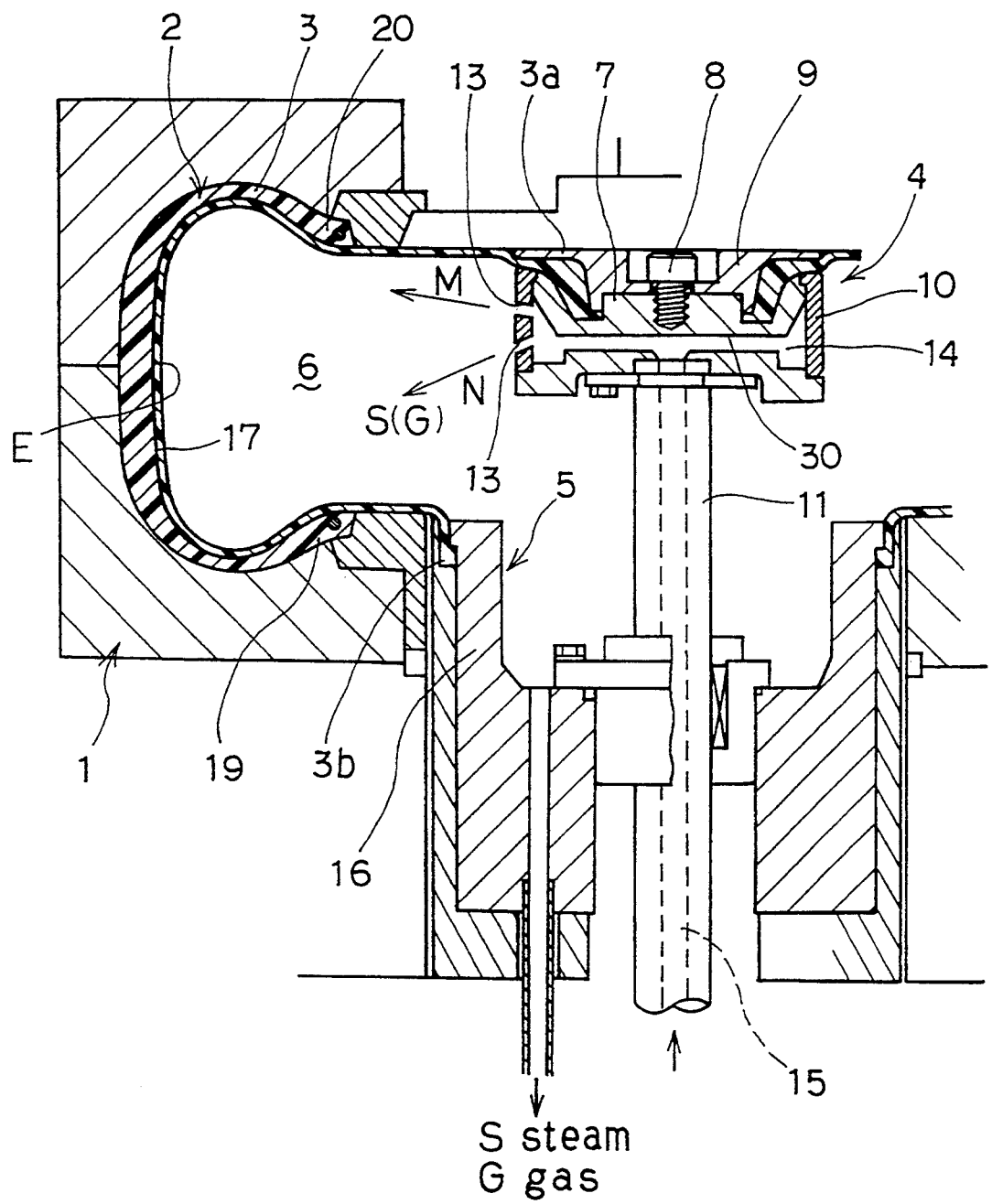
FIG. 3 is a cross sections bowing another embodiment of a vulcanizing apparatus of the present invention.
Figure 4:
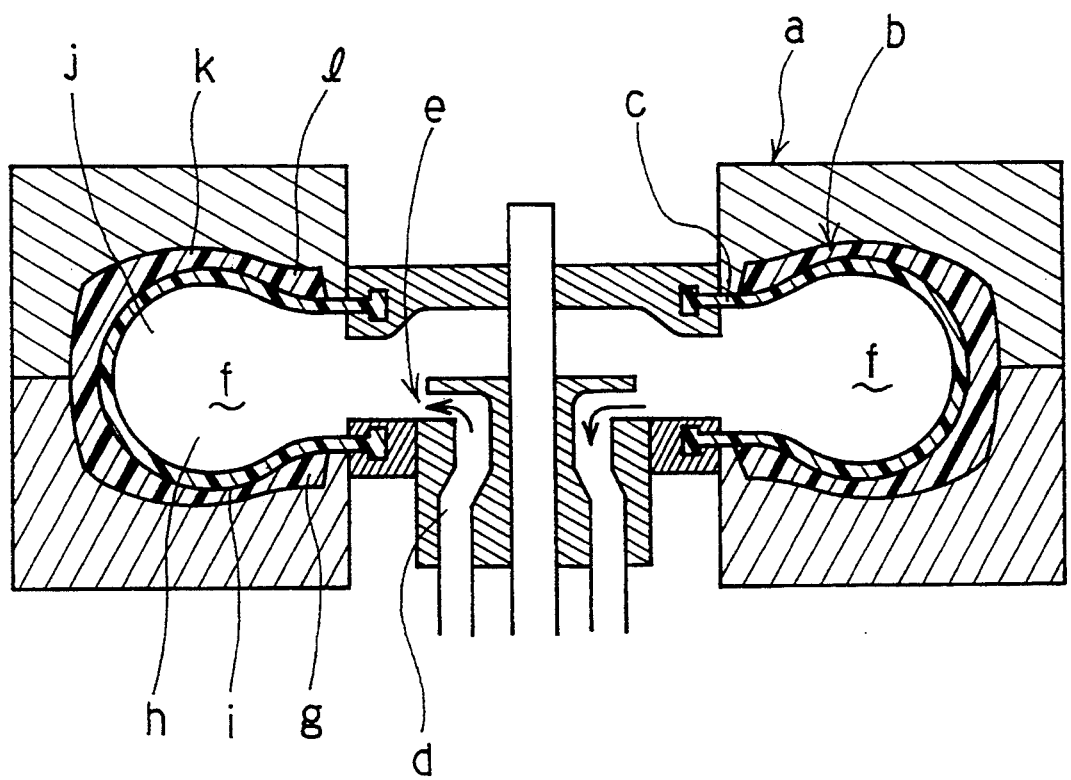
FIG. 4 is a cross section showing a conventional apparatus.

FIG. 3 shows another embodiment of the present invention. In this embodiment, a supply passage 15 for heating medium and pressurizing medium is formed through a center post 11. A communicating passage 30 communicating with a space 14 is formed on a block 7, and the communicating passage 30 is communicated with the supply passage 15 of the center post 11.

In this case, two kinds of supply openings 13 of a supply nozzle 10 are employed, that is, a supply opening directed downward and a supply opening directed upward are both employed. In this embodiment, the one directed upward is directed toward an upper tread of a tire 2 as shown by an arrow M, and the one directed downward is directed toward a lower tread of the tire 2 as shown by an arrow N. Each medium is blown into the tire 2 simultaneously with being directed upward and downward respectively so that abnormal cooling at a lower bead 19 is prevented.

Thus, in this embodiment, the temperature difference between the upper portion and the lower portion in the tire 2 is more certainly prevented.

The present invention is not limited to embodiments stated above, and further modification can be freely made without departing from the spirit or the scope of the present invention. For example, an apparatus of Bag-O-Matic type or an apparatus of bladderless type in which a bladder is not used can be employed.

According to a method and an apparatus of the present invention, the following effects can be achieved.

In vulcanization, abnormal cooling at a lower bead of a tire is prevented and consequently a large temperature difference inside the tire is prevented, so that uniform vulcanization can be carried out to provide products having high quality. Further, the preventing of the temperature difference makes it possible to shorten a time period required for vulcanization, to improve productivity, and to reduce energy loss.

A supply opening for supplying pressurizing medium and another supply opening for supplying heating medium are not required to be formed separately and one supply opening can be cooperatively used so that a structure of the whole apparatus can be simplified and consequently this apparatus can be manufactured cheaply and easily.

When a supply nozzle 10 is attachable, a supply nozzle 10 having a blowing direction corresponding to the shape and size of a tire 2 can be attached easily so that heating medium and pressurizing medium can be supplied in an optimum direction and quantity.

The invention being thus described, it will be obvious that the same may be varied in many ways. Such variations are not to be regarded as a departure from the spirit and scope or the invention, and all such modifications as would be obvious to one skilled in the art are intended to be included within the scope of the following claims.

What is claimed is:

1. A method for vulcanizing a tire comprising the steps of:

placing a tire to be vulcanized in a mold, the tire having a tire equator;

supplying a heating medium to an inner surface of the tire from at least one supply opening positioned above the tire equator, the at least one supply opening being pointed downwardly so that the heating medium is directed downwardly toward a portion of the tire below the tire equator upon release from the at least one supply opening;

supplying a pressurizing medium through the at least one supply opening to the inner surface of the tire after the step of supplying the heating medium, the hearing medium being directed downwardly from the at least one supply opening, the heating medium and pressurizing medium only being supplied through the at least one supply opening positioned above the tire equator such that all of the heating medium and the pressurizing medium are supplied from a position above the tire equator and are directed downwardly toward the portion of the tire below the tire equator; and removing drain accumulated in a lower portion of the inner surface of the tire through a discharge passage by introduction of the heating medium during the step of supplying the heating medium to thereby reduce temperature differences between an upper portion of the tire and the lower portion of the tire.

2. The method for vulcanizing a tire of claim 1, further comprising the step of directing the heating medium downwardly from the at least one supply opening to urge the drain in the lower portion of the tire toward the discharge passage.

3. The method for vulcanizing a tire of claim 2, wherein the step of directing comprises blowing the heating medium from the at least one supply opening above the tire equator toward a portion of the inner surface of the tire below the tire equator.

4. The method for vulcanizing a tire of claim 1, further comprising the step of providing a plurality of supply openings disposed around a circumference of the tire, each of the supply openings supplying the heating medium and the pressurizing medium.

5. The method for vulcanizing a tire of claim 1, further comprising the steps of:

providing an upper bladder clamp, a lower bladder clamp and a bladder;

inflating the bladder after the step of placing the tire in the mold to thereby hold the tire in position; and providing the at least one supply opening in the upper bladder clamp.

6. The method for vulcanizing a tire of claim 1, wherein the heating medium is steam, the drain being accumulated in the lower portion of the tire during the step of supplying the steam and the method further comprising the step of directing the steam downwardly from the at least one supply opening to urge the drain in the lower portion of the tire toward the discharge passage.

7. The method for vulcanizing a tire of claim 6, wherein the pressurizing medium is a pressurized gas and the step of supplying the pressurizing medium further comprises the steps of agitating and cooling the steam.

8. An apparatus for vulcanizing a tire comprising:

means for holding the tire, the tire having a tire equator;

a discharge opening provided adjacent a lower portion of the tire; and means for supplying both heating medium and pressurizing medium to an inner side of the tire, the means for supplying having at least one supply opening positioned above the equator of the tire, the at least one supply opening being directed downwardly toward a portion of the tire below the tire equator, the means for supplying further forcing drain in the lower portion of the tire to the discharge opening whereat the drain is removed, heating medium and pressurizing medium being supplied to the inner side of the tire only through the at lease one supply opening positioned above the equator of the tire such that all of the heating medium and pressurizing medium are supplied from a position above the tire equator and are directed downwardly upon release from the at least one supply opening.

9. The apparatus of claim 8, wherein the means for supplying comprises a passageway and a space defined in the means for holding, the passageway being in fluid communication with the space and the at least one supply opening being in fluid communication with the space, both heating medium and pressurizing medium being sequentially supplied through the passageway and space and then being discharged from the at least one supply opening.

10. The apparatus of claim 9, wherein the means for holding comprises an upper bladder clamp with an inflatable bladder attached thereto, the space and the at least one opening being provided in the upper bladder clamp.

11. The apparatus of claim 10, wherein the means for holding further comprises a lower bladder clamp, the bladder clamps holding ends of the bladder and the upper bladder clamp being provided above the tire equator and the lower bladder clamp being provided below the tire equator, the discharge opening extending through the lower bladder clamp.

12. The apparatus of claim 11, wherein a plurality of supply openings are provided around the periphery of the upper bladder clamp, each of the supply openings being directed downwardly toward a portion of the inner side of the tire below the tire equator.

13. The apparatus of claim 12, further comprising a generally centrally disposed post for supporting the upper bladder clamp, the passageway extending generally parallel and noncoincident with the post.

14. The apparatus of claim 11, wherein a plurality of supply openings are provided around the periphery of the upper bladder clamp, a first group of the supply openings being directed downwardly toward a portion of the inner side of the tire below the tire equator and a second group of the supply openings being directed upwardly, both the first and second groups of supply openings being in fluid communication with the space in the upper bladder clamp.

15. The apparatus of claim 14, further comprising a generally centrally disposed post for supporting the upper bladder clamp, the passageway extending through the post.

16. The apparatus of claim 8, wherein a plurality of supply openings are provided around the periphery of an interior of the tire in the means for holding, each of the supply openings being directed downwardly toward a portion of the inner side of the tire below the tire equator.

17. The apparatus of claim 8, wherein the means for supplying comprises a space defined in the means for holding, a plurality of supply openings being provided around the periphery of an interior of the tire in the means for holding, a first group of the supply openings being directed downwardly toward a portion of the inner side of the tire below the tire equator and a second group of the supply openings being directed upwardly, both the first and second groups of supply openings being in fluid communication with the space in the means for holding.

18. The apparatus of claim 8, wherein the at least one supply opening is formed on a supply nozzle.

19. The method for vulcanizing a tire of claim 1 wherein the tire has a lower bead and the drain comprises an inner open portion of a bladder clamp which engages the lower bead of the tire and a discharge passage located at a bottom of the bladder clamp, both the open inner portion of the bladder clamp and the discharge portion having upper openings, the method further comprising the step of locating both of the upper openings at or below the lower bead of the tire.

20. The apparatus of claim 8, further comprising a bladder clamp for engaging a lower bead of the tire, the bladder clamp having an open interior with an opening on a top side thereof, the discharge opening being an opening in a discharge passage located at a bottom of the bladder clamp, both the opening of the interior of the bladder clamp and the discharge opening being located at or below the lower bead of the tire.

* * * * *

UNITED STATES PATENT AND TRADEMARK OFFICE
CERTIFICATE OF CORRECTION

PATENT NO. : 5,378,425
DATED : January 3, 1995
INVENTOR(S) : Akinori KUBOTA et al.

It is certified that error appears in the above-indentified patent and that said Letters Patent is hereby corrected as shown below:

[75] On the title page:

Change "Shoji Okatmoto" to --Shoji Okamoto-- to correct the spelling of the last name of the third listed inventor.

Signed and Sealed this

Thirteenth Day of June, 1995

Attest:

BRUCE LEHMAN

Attesting Officer

Commissioner of Patents and Trademarks